(12) United States Patent
Hague et al.

(10) Patent No.: US 12,101,022 B2
(45) Date of Patent: Sep. 24, 2024

(54) VOLTAGE CONVERTER

(71) Applicant: STMicroelectronics (Tours) SAS, Tours (FR)

(72) Inventors: Yannick Hague, Mettray (FR); Benoit Renard, Chateau-Renault (FR); Romain Launois, Tours (FR)

(73) Assignee: STMicroelectronics (Tours) SAS, Tours (FR)

( * ) Notice: Subject to any disclaimer, the term of this patent is extended or adjusted under 35 U.S.C. 154(b) by 206 days.

(21) Appl. No.: 17/550,534

(22) Filed: Dec. 14, 2021

(65) Prior Publication Data
US 2022/0200472 A1    Jun. 23, 2022

(30) Foreign Application Priority Data

Dec. 18, 2020 (FR) ...................... 2013664

(51) Int. Cl.
| | |
|---|---|
| *H02M 1/36* | (2007.01) |
| *H02M 1/32* | (2007.01) |
| *H02M 7/06* | (2006.01) |
| *H02M 7/12* | (2006.01) |
| *H02M 7/219* | (2006.01) |

(52) U.S. Cl.
CPC ............... *H02M 1/36* (2013.01); *H02M 1/32* (2013.01); *H02M 1/327* (2021.05); *H02M 7/062* (2013.01); *H02M 7/125* (2013.01); *H02M 7/219* (2013.01)

(58) Field of Classification Search
CPC .......... H02M 1/32; H02M 1/36; H02M 7/062; H02M 7/217; H02M 7/219
See application file for complete search history.

(56) References Cited

U.S. PATENT DOCUMENTS

2011/0110129 A1    5/2011    Busch

FOREIGN PATENT DOCUMENTS

| CN | 103117652 A | 5/2013 |
|---|---|---|
| CN | 108599543 A | 9/2018 |
| EP | 1473818 A1 | 11/2004 |
| EP | 1735901 B1 | 11/2017 |
| EP | 3748831 A1 | 12/2020 |

OTHER PUBLICATIONS

INPI Search Report and Written Opinion for priority application, FR 2013664, report dated Sep. 7, 2021, 9 pages.

*Primary Examiner* — Jue Zhang
(74) *Attorney, Agent, or Firm* — Crowe & Dunlevy LLC

(57) ABSTRACT

A voltage converter includes a circuit formed by a parallel association, connected between first and second nodes, of a first branch and a second branch. The first branch includes a first controlled rectifying element having a first impedance. The second branch includes a resistor associated in series with a second rectifying element having a second impedance substantially equal to the first impedance. The second rectifying element may, for example, be a triac having its gate coupled to receive a signal from an intermediate node in the series association of the second branch. Alternatively, the second rectifying element may be a thyristor having its gate coupled to receive a signal at the anode of the thyristor.

24 Claims, 3 Drawing Sheets

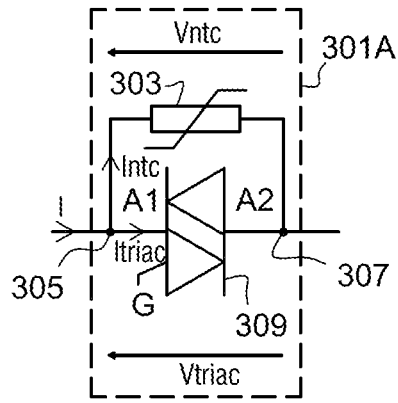
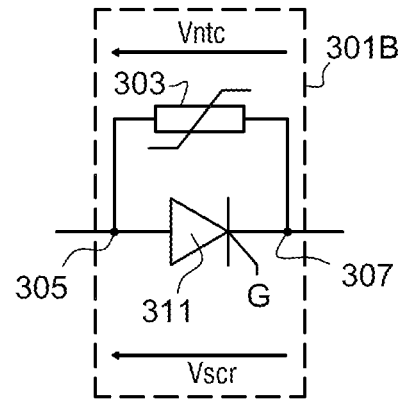
Fig. 3A  Fig. 3B
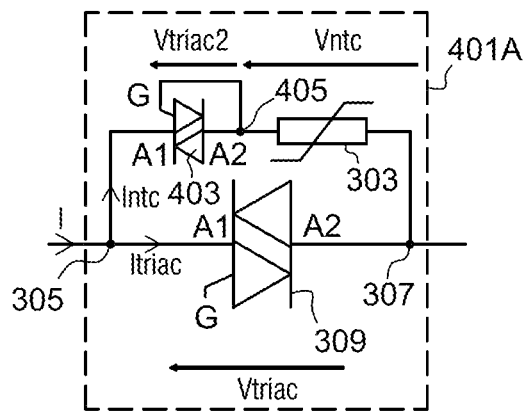
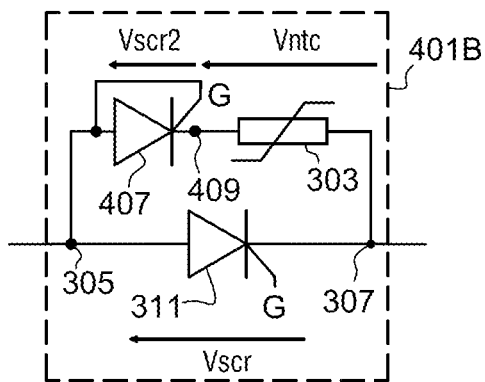
Fig. 4A  Fig. 4B
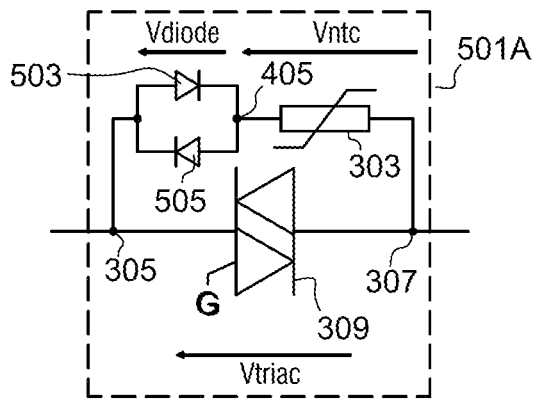
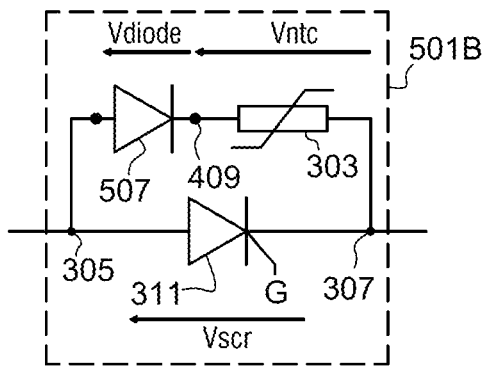
Fig. 5A  Fig. 5B

VOLTAGE CONVERTER

PRIORITY CLAIM

This application claims the priority benefit of French Application for Patent No. 2013664, filed on Dec. 18, 2020, the content of which is hereby incorporated by reference in its entirety to the maximum extent allowable by law.

TECHNICAL FIELD

The present disclosure generally concerns electronic devices and, more particularly, concerns rectifier-type voltage converters, or AC/DC converters, enabling to output a rectified voltage, for example, substantially DC, from an AC voltage source.

BACKGROUND

Many AC/DC converters are known which typically comprise rectifying elements, controllable or not, assembled as a rectifying bridge, and at least one capacitor for filtering, or smoothing, the rectified voltage. Such converters are, in particular, present in switched-mode power supplies that can be commonly found in television sets, central units of desktop computers, lights, etc. At the powering-on of a device comprising such a converter, the filtering capacitive element causes, due to its charge, a strong current inrush. Such a current inrush disturbs the power supply network and damages the converter elements as well as the components or circuits of the device which are coupled thereto.

To overcome this problem, certain AC/DC converters comprise an inrush current limiting circuit. However, once the current has been established, the inrush current limiting circuit causes an unwanted electric power consumption and heating.

There is a need in the art to address all or part of the disadvantages of known voltage converters.

SUMMARY

Embodiments herein increase the power efficiency of known voltage converters. Embodiments herein further increase the reliability of voltage converters.

One embodiment of a voltage converter comprises a circuit comprising a parallel association, between first and second nodes, of a first branch comprising a first controlled rectifying element having a first impedance, and a second branch comprising a resistor associated in series with one or several second rectifying elements having a second impedance substantially equal to the first impedance.

According to one embodiment, the first controlled rectifying element is a first triac.

According to one embodiment, the first controlled rectifying element is a first thyristor.

According to one embodiment, the second branch comprises only one second rectifying element.

According to one embodiment, the second rectifying element is controlled.

According to one embodiment, the second rectifying element is a second triac.

According to one embodiment, the gate of the second triac is coupled, preferably connected, to the second anode of the second triac.

According to one embodiment, the first and second triacs are integrated in a same package.

According to one embodiment, the second controlled rectifying element is a second thyristor.

According to one embodiment, the gate of the second thyristor is coupled, preferably connected, to the anode of the second thyristor.

According to one embodiment, the second rectifying element is a diode.

According to one embodiment, the resistor is in series with an antiparallel association of first and second diodes, the antiparallel association of the first and second diodes having the second impedance.

According to one embodiment, the resistor is configured to dissipate inrush currents.

According to one embodiment, the resistor is a thermistor with a negative temperature coefficient.

According to one embodiment, the converter further comprises: a rectifying bridge; and a capacitor.

One embodiment provides a device comprising a converter as described.

BRIEF DESCRIPTION OF THE DRAWINGS

The foregoing features and advantages, as well as others, will be described in detail in the following description of specific embodiments given by way of illustration and not limitation with reference to the accompanying drawings, in which:

FIG. 3A is a diagram illustrating an example of an inrush current limiting circuit;

FIG. 3B is a diagram illustrating another example of an inrush current limiting circuit;

FIG. 4A is a diagram illustrating an embodiment of an inrush current limiting circuit;

FIG. 4B is a diagram illustrating another embodiment of an inrush current limiting circuit;

FIG. 5A is a diagram illustrating an alternative embodiment of the circuit of FIG. 4A;

FIG. 5B is a diagram illustrating an alternative embodiment of the circuit of FIG. 4B;

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the possible applications of voltage converters have not been detailed, the described embodiments being compatible with usual applications implementing voltage converters.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
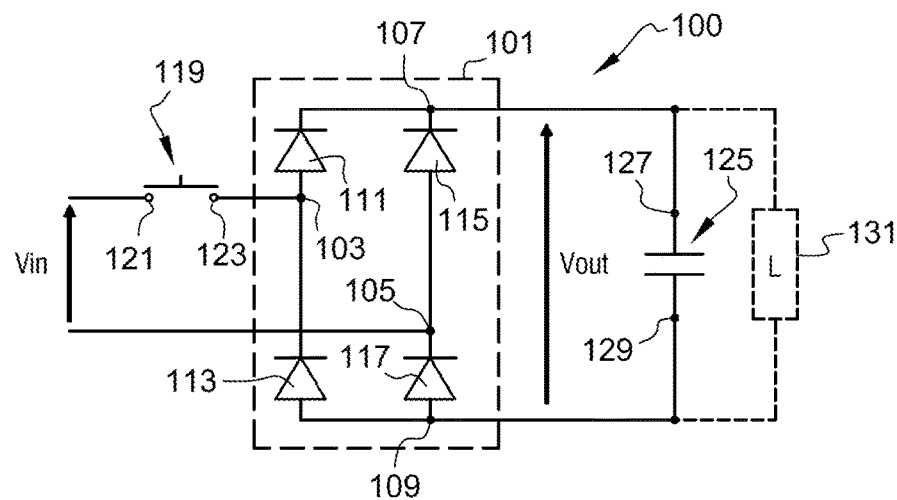
FIG. 1 is a diagram illustrating an example of a voltage converter.

FIG. 1 is a diagram illustrating an example of a voltage converter 100.

In the shown example, voltage converter 100 comprises a rectifying bridge 101. Rectifying bridge 101 receives, as an input, an AC voltage Vin and outputs a rectified voltage Vout.

Input voltage Vin is, for example, a sinusoidal voltage. Voltage Vin is, for example, a single-phase power supply voltage originating from an electric distribution network (not shown), for example, the mains. As an example, input voltage Vin has a root-mean-square (rms) value equal to approximately 230 V and a frequency equal to approximately 50 Hz, or a rms value equal to approximately 110 V and a frequency equal to approximately 60 Hz.

In the example illustrated in FIG. 1, input voltage Vin is applied between a first node 103 and a second node 105 of the rectifying bridge 101 of converter 100. Output voltage Vout is, for example, available between a third node 107 and a fourth node 109 of the rectifying bridge 101 of converter 100. The node 109 of rectifying bridge 101 is, for example, taken to a reference potential, for example the ground.

In the shown example, the rectifying bridge 101 of converter 100 is of non-controlled fullwave type. Rectifying bridge 101 is more particularly, in this example, a diode bridge comprising: a first diode 111, having its anode connected to node 103 and having its cathode connected to node 107; a second diode 113, having its anode connected to node 109 and having its cathode connected to node 103; a third diode 115, having its anode connected to node 105 and having its cathode connected to node 107; and a fourth diode 117, having its anode connected to node 109 and having its cathode connected to node 105.

In the shown example, the first node 103 of rectifying bridge 101 is coupled to the mains via a switch 119. Switch 119, for example, more particularly comprises a terminal 121 connected to a phase conductor of the mains and another terminal 123 connected to the node 103 of bridge 101. The second node 105 of rectifying bridge 101 is, in this example, connected to the mains, for example to a neutral conductor of the mains. Switch 119 is capable of powering on converter 100, that is, of applying, between the nodes 103 and 105 of bridge 101, the voltage Vin (to within voltage drops in the conductors) delivered by the mains.

In the shown example, converter 100 further comprises an electric capacitive element 125, for example, a capacitor. Capacitor 125 is, in this example, connected between the nodes 107 and 109 of rectifying bridge 101. Capacitor 125, for example, more particularly comprises a terminal 127 connected to node 107 and another terminal 129 connected to node 109. Capacitor 125 is, for example, configured to filter or to smooth voltage Vout. Output voltage Vout then, for example, is a substantially DC voltage.

Voltage Vout, for example, enables to power a load 131 (L), shown in dotted lines in FIG. 1, associated in parallel with capacitor 125. Load 131 is, for example, coupled or connected to the nodes 107 and 109 of the rectifying bridge 101 of converter 100.

At the powering-on of converter 100, for example when switch 119 is switched from an off state to an on state, capacitor 125 generates a transient excess current commonly called inrush current or current inrush. The inrush current, having an intensity reaching five to twenty times that of the nominal current, for example, particularly damages the diodes 111, 113, 115, and 117 of rectifying bridge 101 at each powering-on. This adversely affects the reliability of converter 100. The inrush current is further capable of deteriorating the capacitor 125, of causing non-compliance with flicker standards and of disturbing the power supply network.

Figure 2A:
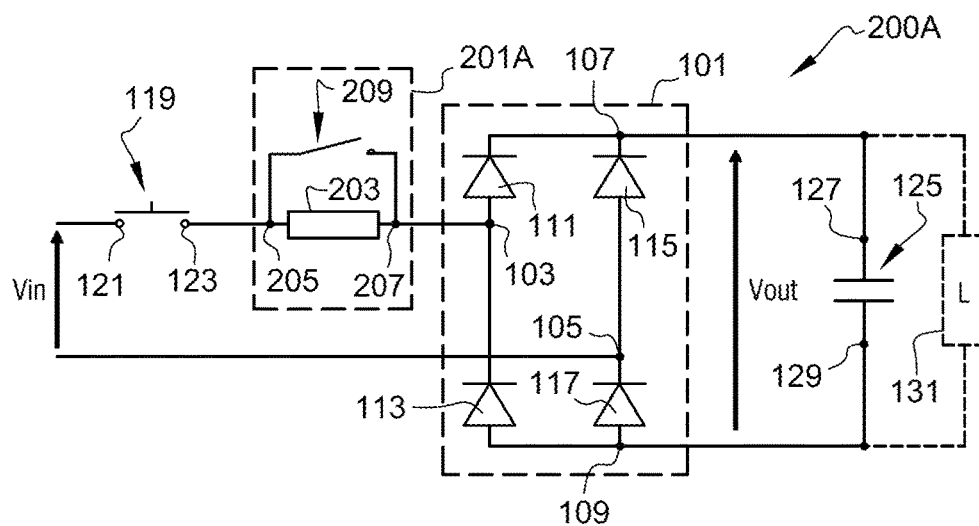
FIG. 2A is a diagram illustrating another example of a voltage converter comprising an inrush current limiting circuit.

FIG. 2A is a diagram illustrating another example of a voltage converter 200A. The voltage converter 200A of FIG. 2A comprises elements common with the voltage converter 100 of FIG. 1. These common elements will not be detailed again hereafter.

The converter 200A of FIG. 2A differs from the converter 100 of FIG. 1 mainly in that converter 200A comprises, in addition to rectifying bridge 101, an inrush current limiting circuit 201A.

In the shown example, circuit 201A is located at the input of converter 200A, on the side of AC input Vin. In this example, circuit 201A is more particularly connected between the first node 103 of rectifying bridge 101 and the terminal 123 of switch 119.

In the shown example, circuit 210A comprises a resistor 203. The resistor 203 of circuit 201A, for example, comprises a terminal 205 connected to the terminal 123 of switch 119 and another terminal 207 connected to the node 103 of rectifying bridge 101.

In the shown example, circuit 201A further comprises a switch 209 associated in parallel with resistor 203, for example connected between the terminals 205 and 207 of resistor 203. In off position, switch 209 forces the flowing of the current through resistor 203.

In the on position, switch 209 connects terminal 205 to terminal 207, which results in shorting resistor 203. The current then mainly flows through switch 209.

As an example, switch 209 is a relay, for example a single-pole electromechanical relay, only the power contact thereof being shown in FIG. 2A.

At the powering-on of converter 200A, for example when switch 119 is switched to the on position, relay 209 is maintained in the off position. The current then flows through resistor 203. Resistor 203 causes a voltage drop between its terminals 205 and 207. This enables to limit the inrush current during the charge of capacitor 125 at the powering-on.

Once capacitor 125 has been charged, for example after a delay following the powering-on of converter 200A, relay 209 is switched to the on position. The current then mainly flows through relay 209. This enables the rectifying bridge 101 of converter 200A to conduct a nominal current adapted according to the application.

Figure 2B:
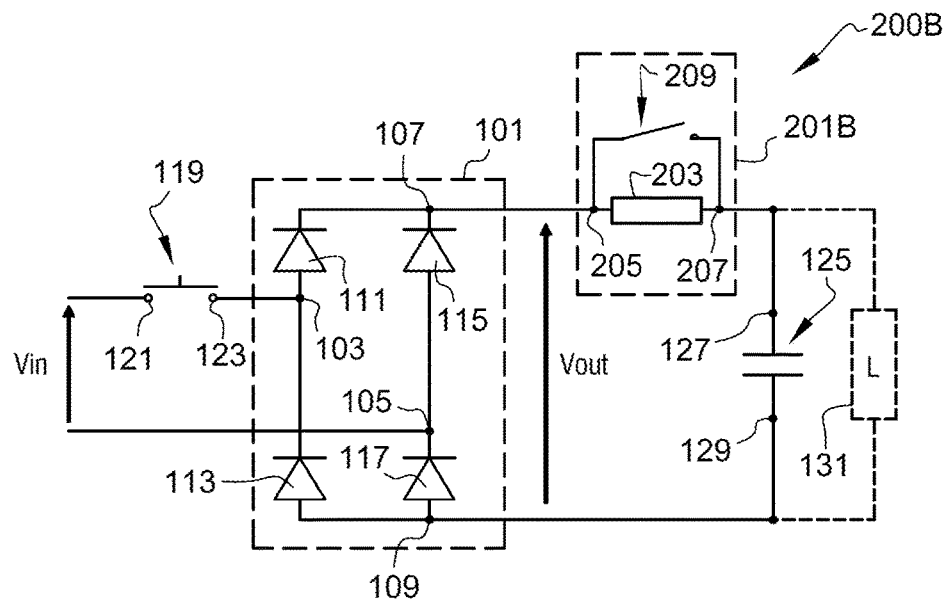
FIG. 2B is a diagram illustrating still another example of a voltage converter comprising an inrush current limiting circuit.

FIG. 2B is a diagram illustrating still another example of a voltage converter 200B. The voltage converter 200B of FIG. 2B comprises elements common with the voltage converter 100 of FIG. 1. These common elements will not be detailed again hereafter.

The converter 200B of FIG. 2B differs from the converter 100 of FIG. 1 mainly in that converter 200B comprises an inrush current limiting circuit 201B located at the output of rectifying bridge 101, on the side of rectified voltage Vout. In this example, circuit 201B is more particularly connected between the third node 107 of rectifying bridge and terminal 127 of capacitor 125.

Circuit 201B is, for example, identical to the circuit 201A of the converter 200B of FIG. 2A. In this case, terminal 205 of the resistor 203 of circuit 201B is connected to node 107 of rectifying bridge 101 and terminal 207 of resistor 203 is connected to terminal 127 of capacitor 125.

The operation of the circuit 201B of converter 200B is similar to that of the circuit 201A of converter 200A such as previously described in relation with FIG. 2A.

A disadvantage of circuits 201A and 201B particularly results from the presence of relay 209. Relay 209 is indeed capable of wearing, for example, by erosion of its power contact at each on-load switching. This adversely affects the reliability of the circuit 201A, 201B forming part of converter 200A, 200B.

Relay 209 further emits noise, typically a click, at each switching. Such a click proves unpleasant for the user and may further disturb vocal recognition systems located close to relay 209, for example integrated to the device comprising converter 200A or 200B.

FIG. 3A is a diagram illustrating an example of an inrush current limiting circuit 301A.

Inrush current limiting circuit 301A comprises a resistor 303. In the shown example, resistor 303 is a thermistor, more particularly a negative temperature coefficient (NTC) thermistor. Thermistor 303 is, in this example, connected between nodes 305 and 307 of circuit 301A.

Circuit 301A further comprises a triac 309, for example, associated in parallel with thermistor 303. In the shown example, triac 309 more particularly has its first anode (A1) connected to node 305 of circuit 301A and its second anode (A2) connected to node 307 of circuit 301A. The expression first anode of a triac designates the anode located on the side of the triac gate (G) while the expression second anode of a triac designates the anode opposite to the first anode.

The circuit 301A illustrated in FIG. 3A is, for example, configured to replace the circuit 201A of the converter 200A of FIG. 2A. Node 305 of circuit 301A, similar to node 205 of circuit 201A, is then connected to terminal 123 of switch 119, for example, while node 307 of circuit 301A, similar to node 207 of circuit 201A, is connected to node 103 of rectifying bridge 101, for example.

Triac 309 is, for example, switched between on states and turned off similarly to what has been previously described for the electromechanical relay 209 of the circuit 201A of FIG. 2A. More particularly, triac 309 is maintained in an off state during the converter power-on phase, for example, to force the flowing of the current through thermistor 303. Once capacitor 125 has been charged, that is, in steady state, triac 309 is then switched to an on state, for example by applying a current pulse to its gate G. Triac 309 then conducts the current in both directions, that is, from its first anode A1 to its second anode A2 and from its second anode A2 to its first anode A1.

In the on state, triac 309 has an impedance much lower than that of the off state. This on-state impedance is however non-zero. As a result, triac 309 causes a voltage drop Vtriac between the terminals 305 and 307 of circuit 301A. As an example, voltage drop Vtriac is in the order of 1 V.

Due to its parallel association with triac 309, thermistor 303 undergoes a voltage drop Vntc. Voltage drop Vntc is in this case substantially equal to voltage drop Vtriac, to within voltage drops in the conductors.

The voltage drop Vntc present across thermistor 303 when triac 309 is in the on state causes the flowing of a current Intc through thermistor 303. As an example, the inventors have estimated that, for an input current I in the order of 6 A reaching node 305, triac 309 conducts a current Itriac in the order of 4 A only, for a current Intc flowing through thermistor 303 in the order of 2 A.

Current Intc is responsible for a heating of thermistor 303 by Joule effect. This heating causes a strong decrease in the power efficiency of the converter comprising circuit 301A, and causes a premature wearing of thermistor 303. In the shown example where thermistor 303 has a negative temperature coefficient, the heating of thermistor 303 additionally causes a resistance decrease tending to amplify the phenomenon. Such a resistance decrease indeed favors the flowing of a more significant current Intc through thermistor 303, and thus an additional heating, and so on.

FIG. 3B is a diagram illustrating another example of an inrush current limiting circuit 301B. The circuit 301B of FIG. 3B comprises elements common with the circuit 301A of FIG. 3A. These common elements will not be detailed again hereafter.

The circuit 301B of FIG. 3B differs from the circuit 301A of FIG. 3A mainly in that circuit 301B comprises, instead of triac 309, a thyristor 311. In the shown example, thyristor 311 (a Silicon-Controlled Rectifier (SCR)) has its anode connected to node 305 of circuit 301B and its cathode connected to node 307 of circuit 301B.

The circuit 301B illustrated in FIG. 3B is, for example, configured to replace the circuit 201B of the converter 200B of FIG. 2B. Node 305 of circuit 301B, similar to node 205 of circuit 201B, is then connected to node 107 of rectifying bridge 101, for example, while node 307 of circuit 301B, similar to node 207 of circuit 201B, is connected to terminal 127 of capacitor 125, for example.

Thyristor 311 is, for example, switched between on states and turned off similarly to what has been previously described for the electromechanical relay 209 of the circuit 201B of FIG. 2B. More particularly, thyristor 311 is maintained in an off state during the converter power-on phase, for example to force the flowing of the current through thermistor 303. Once capacitor 125 has been charged, that is, in steady state, thyristor 311 is then switched to an on state, for example by applying a current pulse to its gate G. The thyristor then conducts the current in a single direction, that is, from its anode to its cathode.

In the on state, thyristor 311 has an impedance much smaller than that of the off state. This on-state impedance is however non-zero. As a result, thyristor 311 causes a voltage drop Vscr between the terminals 305 and 307 of circuit 31B.

Due to its parallel association with thyristor 311, thermistor 303 undergoes a voltage drop Vntc substantially equal to voltage drop Vscr, to within voltage drops in the conductors. Similarly to what has been previously described in relation with FIG. 3A, voltage Vntc causes a heating of thermistor 303, so that the circuit 301B of FIG. 3B has disadvantages similar to those of the circuit 301A of FIG. 3A mentioned hereabove.

FIG. 4A is a diagram illustrating an embodiment of an inrush current limiting circuit 401A. The circuit 401A of FIG. 4A comprises elements common with the circuit 301A of FIG. 3A. These common elements will not be detailed again hereafter.

The circuit 401A of FIG. 4A differs from the circuit 301A of FIG. 3A mainly in that circuit 401A comprises another triac 403 coupled, preferably connected, between node 305 and thermistor 303. More particularly, in the shown example, triac 403 has its first anode A1 coupled, preferably connected, to node 305 and its second anode A2 coupled, preferably connected, to a node 405. Gate G of triac 403 is connected to node 405, for example, so that the triac remains controlled to the on state as long as the converter comprising circuit 401A is maintained powered on. Thermistor 303 is, for example, connected between nodes 405 and 307 of circuit 401A.

As an example, triac 403 exhibits a nominal operating current smaller than that of triac 309. This advantageously enables to provide a triac 403 having smaller dimensions than triac 309.

According to this embodiment, circuit 401A thus comprises a parallel association, between nodes 305 and 307 of: a first branch comprising a first controlled rectifying element, for example, triac 309; and a second branch comprising a resistor, for example, thermistor 303, associated in series with a second rectifying element, for example, a second controlled rectifying element, for example, triac 403.

As an example, triacs 309 and 403 may be part of separate components. For example, triacs 309 and 403 are integrated in separate packages. Alternatively, triacs 309 and 403 are part of a same component. For example, triacs 309 and 403 are integrated in a same package, the package containing, for example, two chips each corresponding to one of the triacs 309 and 403.

In the on state, triac 403 has an impedance much lower than that of the off state. This on-state impedance is however non-zero. As a result, triac 403 causes a voltage drop Vtriac2 between the terminals 305 and 405 of circuit 401A.

According to a preferred embodiment, triacs 309 and 403 have substantially equal on-state impedances. As a result, the voltage drop Vtriac2 caused by triac 403 is substantially equal, to within voltage drops in the conductors, to the voltage drop Vtriac caused by triac 309. Due to the series association of triac 403 and of thermistor 303, the voltage drop Vntc across thermistor 303 is then substantially zero.

As an example, the inventors have estimated that, for an input current I in the order 6 A reaching node 305, triac 309 conducts a current Itriac in the order of 5.9 A while the current Intc flowing through triac 403 and thermistor 303 is in the order of 100 mA only.

An advantage of circuit 401A lies in the fact that the current Intc flowing through thermistor 303 is much lower than in the case of circuit 301A. This results in a lighter heating of thermistor 303 in circuit 401A, and thus in a limitation of the heating of the ambient air and a longer lifetime.

FIG. 4B is a diagram illustrating another embodiment of an inrush current limiting circuit 401B. The circuit 401B of FIG. 4B comprises elements common with the circuit 301B of FIG. 3B. These common elements will not be detailed again hereafter.

The circuit 401B of FIG. 4B differs from the circuit 301B of FIG. 3B mainly in that circuit 401B comprises another thyristor 407 coupled, preferably connected, between node 305 and thermistor 303. More particularly, in the shown example, thyristor 407 has its anode coupled, preferably connected, to node 305 and its cathode coupled, preferably connected, to a node 409. The gate G of thyristor 407 is connected to node 305, for example, so that the thyristor remains controlled to the on state as long as the converter comprising circuit 401B is maintained powered on. Thermistor 303 is, for example, connected between nodes 409 and 307 of circuit 401B.

As an example, thyristor 407 has a nominal operating current smaller than that of thyristor 311. This advantageously enables to provide a thyristor 407 having smaller dimensions than thyristor 311.

According to this embodiment, circuit 401B thus comprises a parallel association, between nodes 305 and 307 of: a first branch comprising a first controlled rectifying element, for example, thyristor 311; and a second branch comprising a resistor, for example thermistor 303, associated in series with a second rectifying element, for example, a controlled rectifying element, for example, thyristor 407.

In the on state, thyristor 407 has an impedance much smaller than that in the off state. This on-state impedance is however non-zero. As a result, thyristor 407 causes a voltage drop Vscr2 between the terminals 305 and 409 of circuit 401B.

According to a preferred embodiment, thyristors 311 and 407 have substantially equal on-state impedances. As a result, the voltage drop Vscr2 caused by thyristor 407 is substantially equal, to within voltages drops in the conductors, to the voltage drop Vscr caused by thyristor 311. Due to the series association of thyristor 407 and of thermistor 303, the voltage drop Vntc across thermistor 303 is then substantially zero.

Similarly to what has been previously described in relation with FIG. 4A, the current flowing through thyristor 407 and through thermistor 303 is thus strongly decreased, so that the circuit 401B of FIG. 4B has advantages similar to those of the circuit 401A of FIG. 4A mentioned hereabove.

FIG. 5A is a diagram illustrating a circuit 501A. Circuit 501A corresponds, for example, to an alternative embodiment of the circuit 401A of FIG. 4A. In this variant, triac 403 is replaced with an antiparallel association of two diodes 503 and 505 between nodes 305 and 405. In other words, diodes 503 and 505 are associated in parallel and assembled head-to-tail between nodes 305 and 405 of circuit 501A. In yet other words, diodes 503 and 505 are in parallel and interconnected by opposite electrodes. More particularly, in the shown example, diode 503 has its anode connected to node 305 and its cathode connected to node 405 while diode 505 has its anode connected to node 405 and its cathode connected to node 305. In the circuit 501A of FIG. 5A, diodes 503 and 505 correspond to two non-controlled rectifying elements in antiparallel.

The antiparallel association of diodes 503 and 505 preferably has an impedance substantially equal to that of triac 309 so that it is capable of generating, between nodes 305 and 405, a voltage drop Vdiode substantially equal to the voltage drop Vtriac between nodes 305 and 307. The alternative embodiment illustrated in FIG. 5A thus has advantages similar to those described in relation with FIG. 4A.

FIG. 5B is a diagram illustrating a circuit 501B. Circuit 501B corresponds, for example, to an alternative embodiment of the circuit 401B of FIG. 4B. In this variant, thyristor 407 is replaced with a diode 507. Diode 507 is, for example, connected between nodes 305 and 409 of circuit 501B. More particularly, in the shown example, diode 507 has its anode connected to node 305 and its cathode connected to node 409. In the circuit 501B of FIG. 5B, diode 507 forms a non-controlled rectifying element.

Diode 507 preferably has an impedance substantially equal to that of thyristor 311 so that it is capable of generating, between nodes 305 and 409, a voltage drop Vdiode substantially equal to the voltage drop Vscr between nodes 305 and 307. The alternative embodiment illustrated in FIG. 5B thus has advantages similar to those described in relation with FIG. 4B.

Although this has not been shown, it could be provided to replace the thyristor 311 of the circuits 401B and 501B of FIGS. 4B and 5B with a triac, for example, the triac 309 of the circuits 401A and 501A of FIGS. 4A and 5A. It could further be provided to replace the thyristor 407 of the circuit 401B of FIG. 4B with a triac, for example, similar to the triac 403 of FIG. 4A. In these two cases, advantages similar to those previously described in relation with FIGS. 4B and 5B would be obtained.

Figure 6A:
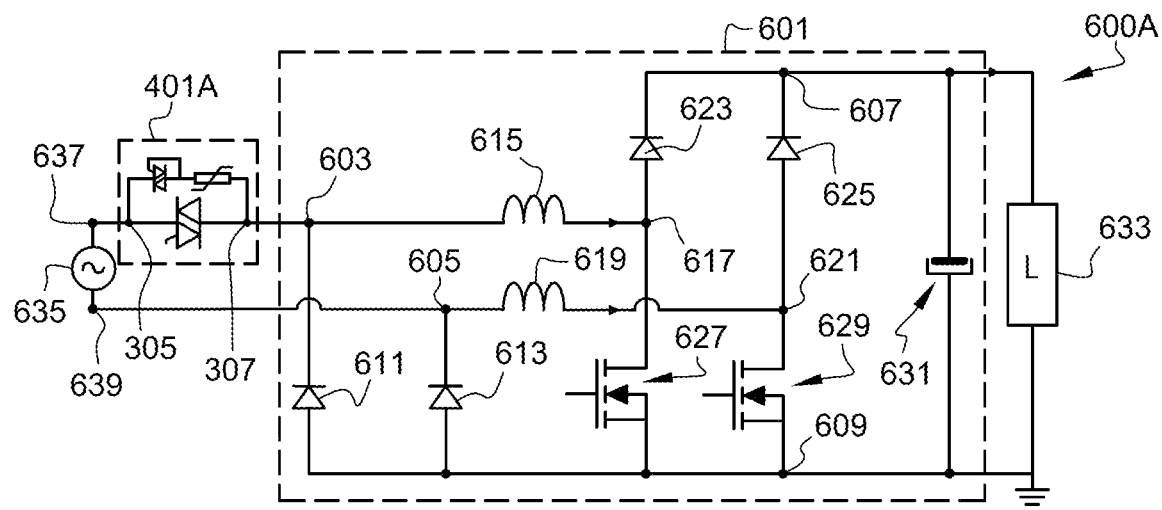
FIG. 6A is a diagram illustrating an embodiment of a voltage converter.

FIG. 6A is a diagram illustrating an embodiment of a voltage converter 600A. FIG. 6A more particularly shows another example of implementation of the inrush current limiting circuit 401A of FIG. 4A.

In the shown example, voltage converter 600A comprises a mixed-type rectifying bridge 601, that is, comprising non-controlled rectifying elements and controlled rectifying elements. Rectifying bridge 601 is more particularly a symmetrical mixed bridge having two input nodes 603, 605 and two output nodes 607, 609. In the shown example, rectifying bridge 601 comprises: a first diode 611, having its anode connected to node 609 and having its cathode connected to node 603; a second diode 613, having its anode connected to node 609 and having its cathode connected to node 605; a first inductance 615, for example an inductor, having a terminal connected to node 603 and having its other terminal connected to an intermediate node 617; a second inductance 619, for example an inductor, having a terminal connected to node 605 and having its other terminal connected to another intermediate node 621; a third diode 623, having its anode connected to node 617 and having its cathode connected to node 607; a fourth diode 625, having its anode connected to node 621 and having its cathode connected to node 607; a first transistor 627, for example, of N-channel metal-oxide-semiconductor (MOS) type, having its source connected to node 609 and having its drain connected to node 617; and a second transistor 629, for example, of N-channel MOS type, having its source connected to node 609 and having its drain connected to node 621.

Rectifying bridge 601 further comprises a capacitive element, for example, a chemical capacitor 631, connected between output nodes 607 and 609 of rectifying bridge 601. Capacitor 631 is, for example, configured to smooth the rectified voltage at the output of bridge 601.

Node 609 is, for example, taken to a reference potential such as the ground in the shown example.

A load 633 (L) to be powered is, for example, connected between nodes 607 and 609 of rectifying bridge 601. Load 633 receives a smoothed rectified power supply voltage at the output of rectifying bridge 601.

In the shown example, bridge 601 is powered by an AC voltage source 635. Source 635, for example, comprises a terminal 637 coupled to the input node 603 of rectifying bridge 601 via the inrush current limiting circuit 401A previously described in relation with FIG. 4A. In this case, the node 305 of circuit 401A is, for example, connected to terminal 637 and the node 307 of circuit 401A is, for example, connected to node 603.

Converter 600A with rectifying bridge 601 may comprise other components or circuits, not shown in FIG. 6A. Bridge 601 may in particular comprise a circuit of protection against possible overvoltages (not shown).

Rectifying bridge 601 is an example of a controlled bridge of pulse-width modulation (PWM) type enabling to regulate the DC current supply according to load 633. Transistors 627 and 629 of bridge 601, here equivalent to switches, are switched between off and on states at a frequency greater than that of the AC power supply voltage of converter 600A, for example. As an example, the switching frequency of transistors 627 and 629 is in the order of ten kilohertz. Transistors 627 and 629 are switched to the on state during respectively positive and negative halfwaves of the AC power supply voltage of converter 600A.

When transistor 627, 629 is in the on state (equivalent to an on switch), energy is temporarily stored in the corresponding inductance 615, 619. When transistor 627, 629 is switched to the off state (equivalent to an off switch), the energy stored in inductance 615, 619 is then released and enables to charge, via the corresponding diode 623, 625, capacitive element 631. Each diode 611, 613 of bridge 601 here plays the role of a free wheel diode, by enabling the flowing of the current through the corresponding inductance 615, 619 when the associated transistor 627, 629 is in the off state (off switch).

Converter 600A, comprising rectifying bridge 601 and inrush current limiting circuit 401A, particularly has an improved power efficiency and an increased reliability with respect to the converter 100 of FIG. 1 and with respect to the converters 200A and 200B of FIGS. 2A and 2B respectively comprising circuits 201A and 201B or 301A and 301B.

Figure 6B:
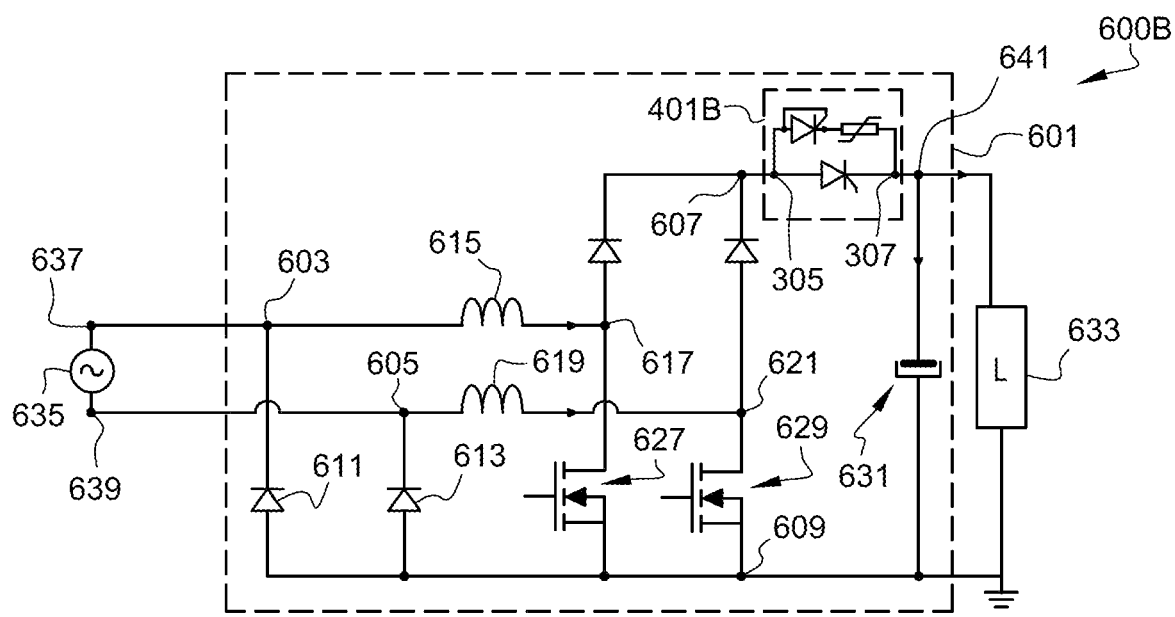
FIG. 6B is a diagram illustrating another embodiment of a voltage converter.

FIG. 6B is a diagram illustrating another embodiment of a voltage converter 600B. The converter 600B of FIG. 6B comprises elements common with the converter 600A of FIG. 6A. These common elements will not be described again hereafter.

The converter 600B of FIG. 6B differs from the converter 600A of FIG. 6A mainly in that converter 600B does not comprise circuit 401A on the AC current side, but comprises the circuit 401B of FIG. 4B on the DC current side. More particularly, in the shown example, circuit 401B is connected between node 607 of rectifying bridge 601 and a node 641. In this case, node 305 of circuit 401B is, for example, connected to node 607 and node 307 of circuit 401B is, for example, connected to node 641.

In the shown example, chemical capacitor 631 and load 633 (L) each have a terminal connected to node 641 and another terminal connected to node 609 of application of the reference potential.

Converter 600B has advantages similar to those of converter 600A. In particular, converter 600B has an improved power efficiency and an increased reliability as compared with existing converters.

Another advantage of converter 600B lies in the fact that circuit 401B only conducts when transistor 627 or 629 is opened. This results in even lower conduction losses that in circuit 401A of converter 600A, where circuit 401A conducts continuously.

Figure 7:
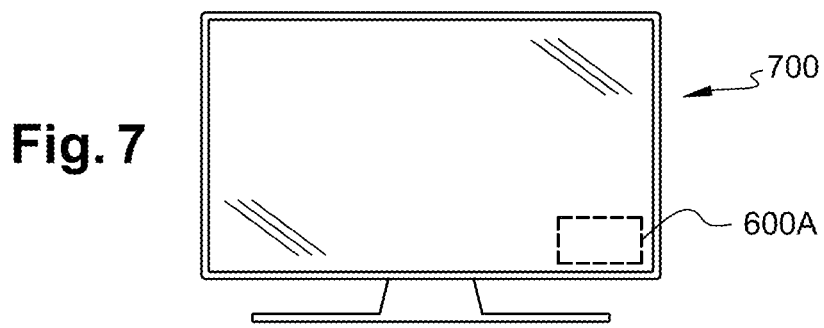
FIG. 7 shows a device comprising a voltage converter.

FIG. 7 shows a device 700 comprising a voltage converter, for example, the converter 600A previously described in relation with FIG. 6A.

Device 700 is, in the shown example, a television screen, or television set. The provision of voltage converter 600A enables television set 700 to have a decreased electric power consumption as well as a heat dissipation smaller than those of a television set which would in particular comprise the converter 200A (FIG. 2A) comprising circuit 201A or 301A, or the converter 200B (FIG. 2B) comprising circuit 201B or 301B. This further enables to increase the reliability and the lifetime of television set 700.

Various embodiments and variants have been described. Those skilled in the art will understand that certain features of these various embodiments and variants may be combined, and other variants will occur to those skilled in the art. In particular, the converters 600A and 600B of FIGS. 6A and 6B may respectively implement the embodiments of circuits 501A and 501B discussed in relation with FIGS. 5A and 5B.

Finally, the practical implementation of the described embodiments and variants is within the abilities of those skilled in the art based on the functional indications given hereabove. In particular, the sizing of the rectifying elements, particularly, of triac 403, of thyristor 407, and of diodes 503, 505, and 507, is within the abilities of those skilled in the art.

Further, although an example of application of the described embodiments to a television set has been described in relation with FIG. 7, the described embodiments can be transposed to other types of devices comprising at least one AC/DC converter, for example, of the type of the converters 200A, 200B, 600A, and 600B of FIGS. 2A, 2B, 6A, and 6B, respectively.

It will further be within the abilities of those skilled in the art to integrate the circuits 401A and 501A of FIGS. 4A and 5A or the circuits 401B and 501B of FIGS. 4B and 5B in voltage converters having an architecture and/or rectifying elements different from those described. In particular, the embodiments are not limited to the described examples of rectifying bridges 101 and 601.

The invention claimed is:

1. A voltage converter including a circuit comprising a parallel association, connected between first and second nodes, of:
   a first branch comprising a controlled rectifying element having a first impedance; and
   a second branch comprising a resistor associated in series with a first triac having a second impedance substantially equal to the first impedance;
   wherein said first triac includes a first anode, a second anode coupled in series to the resistor at an intermediate node, and a gate configured to receive a first signal generated at the intermediate node.

2. The converter according to claim 1, wherein the controlled rectifying element is a thyristor.

3. The converter according to claim 1, wherein the controlled rectifying element is a second triac, said second triac having a first anode connected to the first anode of the first triac, a second anode connected to the resistor, and a gate configured to receive a second signal.

4. The converter according to claim 3, wherein the first and second triacs are integrated in a same package.

5. The converter according to claim 1, wherein the first triac is the only rectifying circuit element present in the second branch.

6. The converter according to claim 1, wherein the second anode of the first triac is directly electrically connected to the intermediate node and wherein a terminal of the resistor is directly electrically connected to the intermediate node and wherein the gate of the first triac is directly electrically connected to the intermediate node.

7. The converter according to claim 1, wherein the resistor is a negative temperature coefficient (NTC) thermistor.

8. The converter according to claim 1, further comprising:
   a rectifying bridge; and
   a capacitor.

9. A device comprising a converter according to claim 1.

10. A voltage converter including a circuit comprising a parallel association, connected between first and second nodes, of:
   a first branch comprising a controlled rectifying element having a first impedance; and
   a second branch comprising a resistor associated in series with a first thyristor having a second impedance substantially equal to the first impedance;
   wherein said first thyristor includes an anode, a cathode coupled in series to the resistor at an intermediate node, and a gate configured to receive a first signal generated at the anode of the first thyristor.

11. The converter according to claim 10, wherein the controlled rectifying element is a triac.

12. The converter according to claim 10, wherein the controlled rectifying element is a second thyristor, said second thyristor having an anode connected to the anode of the first thyristor, a cathode connected to the resistor, and a gate configured to receive a second signal.

13. The converter according to claim 12, wherein the first and second thyristors are integrated in a same package.

14. The converter according to claim 10, wherein the first thyristor is the only rectifying circuit element present in the second branch.

15. The converter according to claim 10, wherein the cathode of the first thyristor is directly electrically connected to the intermediate node and wherein a terminal of the resistor is directly electrically connected to the intermediate node and wherein the gate of the first thyristor is directly electrically connected to the anode of the first thyristor.

16. The converter according to claim 10, wherein the resistor is a negative temperature coefficient (NTC) thermistor.

17. The converter according to claim 10, further comprising:
   a rectifying bridge; and
   a capacitor.

18. A device comprising a converter according to claim 10.

19. A voltage converter including a circuit comprising a parallel association, connected between first and second nodes, of:
   a first branch comprising a controlled rectifying element having a first impedance; and
   a second branch comprising a resistor associated in series with an uncontrolled rectifying element having a second impedance substantially equal to the first impedance;
   wherein said uncontrolled rectifying element is an antiparallel association of first and second diodes.

20. The converter according to claim 19, wherein the controlled rectifying element is one of a triac or a thyristor.

21. The converter according to claim 19, wherein the antiparallel association of first and second diodes comprises an anode of the first diode directly electrically connected to a cathode of the second diode and a cathode of the first diode directly electrically connected to both an anode of the second diode and the resistor.

22. The converter according to claim 19, wherein the resistor is a negative temperature coefficient (NTC) thermistor.

23. The converter according to claim 19, further comprising:
   a rectifying bridge; and
   a capacitor.

24. A device comprising a converter according to claim 19.

* * * * *